(12) United States Patent
Holguin

(10) Patent No.: US 8,240,168 B2
(45) Date of Patent: Aug. 14, 2012

(54) CONDENSATION PUMP FOR ROOF-TOP AIR CONDITIONER

(75) Inventor: Ricardo Holguin, Vado, NM (US)

(73) Assignee: Dometic LLC, Elkhart, IN (US)

( * ) Notice: Subject to any disclaimer, the term of this patent is extended or adjusted under 35 U.S.C. 154(b) by 874 days.

(21) Appl. No.: 12/276,660

(22) Filed: Nov. 24, 2008

(65) Prior Publication Data

US 2010/0126198 A1    May 27, 2010

(51) Int. Cl.
F25D 21/14    (2006.01)
(52) U.S. Cl. ............................................. 62/285; 62/291
(58) Field of Classification Search .................... 62/285, 62/289, 291, 92, 280
See application file for complete search history.

(56) References Cited

U.S. PATENT DOCUMENTS

| | | | |
|---|---|---|---|
| 4,136,529 A | 1/1979 | McCarty | |
| 4,494,384 A | 1/1985 | Lott | |
| 6,357,249 B1 | 3/2002 | Robinson et al. | |
| 6,592,333 B1* | 7/2003 | Magallanes | 417/36 |
| 6,751,975 B1 | 6/2004 | Reimann | |
| 6,880,354 B2 | 4/2005 | Reimann et al. | |
| 6,976,367 B2* | 12/2005 | Spanger | 62/129 |
| 2002/0046569 A1* | 4/2002 | Faqih | 62/188 |
| 2004/0237561 A1 | 12/2004 | Duarte Barreto Junior | |
| 2006/0107684 A1* | 5/2006 | Hwang et al. | 62/419 |
| 2006/0179676 A1* | 8/2006 | Goldberg et al. | 34/77 |
| 2006/0228233 A1* | 10/2006 | Cook | 417/360 |
| 2007/0084228 A1 | 4/2007 | Heck | |
| 2008/0017571 A1 | 1/2008 | Koo | |
| 2008/0028771 A1* | 2/2008 | Nagae | 62/78 |

FOREIGN PATENT DOCUMENTS

| | | |
|---|---|---|
| DE | 2514152 A1 | 10/1976 |
| DE | 4110081 A1 | 10/1992 |
| JP | 2-254053 | * 3/1989 |
| JP | 10193957 | 7/1998 |

OTHER PUBLICATIONS

Abstract of JP 2-254053 to Matsumoto et al.*
European Search Report for EP09176766 dated Feb. 24, 2010.

* cited by examiner

Primary Examiner — Mohammad Ali
(74) Attorney, Agent, or Firm — Pearne & Gordon LLP

(57) ABSTRACT

A pump assembly and a method for removing condensate from an elevated air conditioner of a transport structure are provided. The air conditioner includes a base pan with a sump. The pump assembly includes a pump, a suction line and a discharge line. The pump is configured to be in electrical communication with the air conditioner. The suction line enters the pump and is configured to be in fluid communication with the sump. The discharge line exits the pump and is configured to be in fluid communication with a hose of a drainage means of the transport structure. The pump operatively moves condensate in the sump to the hose of the drainage means to remove the condensate from the transport structure.

19 Claims, 3 Drawing Sheets

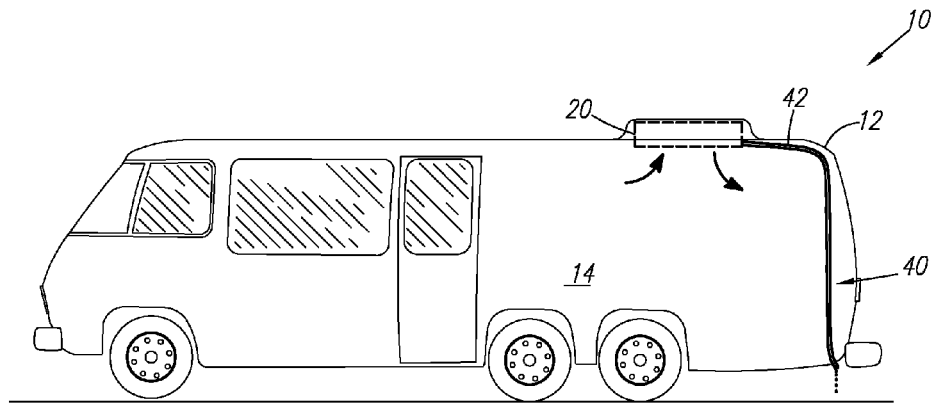

Fig. 1

| Thermostat mode | CCC AC | CCC HP | CCCII AC | CCCII HP |
|---|---|---|---|---|
| High Fan only | pump off | pump off | pump off | pump off |
| Medium Fan only | pump off | pump off | pump off | pump off |
| Low Fan only | pump off | pump off | pump off | pump off |
| High Cool (compressor on) | pump ON | pump off | pump ON | pump ON |
| Medium Cool (compressor on) | pump ON | pump off | pump ON | pump ON |
| Low Cool (compressor on) | pump ON | pump off | pump ON | pump ON |
| High Heat (compressor on) | N/A | pump off | N/A | pump ON |
| Medium Heat (compressor on) | N/A | pump off | N/A | pump ON |
| Low Heat (compressor on) | N/A | pump off | N/A | pump ON |
| Dehumidifier (only with CCCII controls) (compressor on) | N/A | N/A | pump ON | dehumidifier mode pump ON |

Fig. 5

CONDENSATION PUMP FOR ROOF-TOP AIR CONDITIONER

FIELD OF THE INVENTION

The present invention relates generally to pumps for removing condensate, and more particularly, to pumps for removing condensate from roof-top air conditioners.

BACKGROUND OF THE INVENTION

Providing an air conditioner on or near the roof of a structure is common for transportation means such as buses, recreational vehicles, mobile homes, or boats. In such arrangements of air conditioners, the disposal of condensate from evaporators must be dealt with because it can lead to unsightly stains on the roof or walls of the structure if the condensate is allowed to simply flow down from the roof by gravity. Even if condensate water is removed without contacting the roof, the use of gravity to move condensate may undesirably raise the height of the structure. Moreover, means for providing a force for driving condensate may be constrained by the dimensions of the air conditioner. Thus, there is a need to remove the condensate from the roof by means other than gravity and to provide a condensate removal system within the confines of the existing air conditioner.

BRIEF SUMMARY OF THE INVENTION

To achieve the foregoing and other aspects and in accordance with the present invention, a pump assembly for removing condensate from an elevated air conditioner of a transport structure is provided. The air conditioner includes a base pan with a sump and the assembly includes a pump, a suction line, and a discharge line. The pump is configured to be in electrical communication with the air conditioner. The suction line enters the pump and is configured to be in fluid communication with the sump. The discharge line exits the pump and is configured to be in fluid communication with a hose of a drainage means of the transport structure. The pump operatively moves condensate in the sump to the hose of the drainage means to remove the condensate from the transport structure.

In accordance with another aspect of the invention, the drainage means is gravity-driven.

In accordance with yet another aspect of the invention, the pump is not located below a water level of the sump.

In accordance with yet another aspect of the invention, the pump is dimensioned to be housed completely inside the air conditioner.

In accordance with yet another aspect of the invention, the pump is mounted in an isolated manner inside the air conditioner.

In accordance with yet another aspect of the invention, the pump is supported by a rubber grommet mounted on a bracket element.

In accordance with yet another aspect of the invention, the pump assembly is provided as an add-on kit to the air conditioner.

In accordance with yet another aspect of the invention, the discharge line includes an upstream portion with a first diameter and a downstream portion with a second diameter, and the first diameter is less than the second diameter.

In accordance with yet another aspect of the invention, the suction line includes an upstream portion with a third diameter and a downstream portion with a fourth diameter, and the third diameter is less than the fourth diameter.

In accordance with yet another aspect of the invention, the suction line includes a filter at an upstream end.

In accordance with yet another aspect of the invention, the pump is configured to be off during an evaporator fan only mode of the air conditioner, and wherein the pump is configured to be on when a compressor is on during a cooling mode of the air conditioner.

In accordance with yet another aspect of the invention, the pump is configured to be on when a compressor is on during a heating mode of the air conditioner.

In accordance with yet another aspect of the invention, the pump is configured to be on when a compressor is on during a dehumidifier mode of the air conditioner.

In accordance with yet another aspect of the invention, the pump includes a sealant for sealing a drainage hole on the base pan of the air conditioner.

In accordance with the invention, a method of removing condensate from an elevated air conditioner of a transport structure is provided. The air conditioner includes a base pan with a sump. The method includes steps of mounting a pump inside an air conditioner, the pump including a suction line entering the pump and a discharge line exiting the pump; connecting the discharge line to a drainage means of the transport structure; establishing fluid communication between the suction line and the sump; and configuring the pump to operate through electrical communication with the air conditioner. The suction line, the pump, the discharge line and the drainage means are configured to operatively establish fluid communication.

In accordance with another aspect of the invention, the step of establishing fluid communication between suction line and the sump further includes submerging an upstream end of the suction line in the sump.

In accordance with yet another aspect of the invention, the method further includes the step of mounting the pump not below a water level of the sump.

In accordance with yet another aspect of the invention, the method further includes the step of sealing a hole on the base pan to create the sump.

In accordance with yet another aspect of the invention, the pump is dimensioned to be housed completely inside the air conditioner.

In accordance with yet another aspect of the invention, the method further includes the step of configuring the pump to be off during an evaporator fan only mode of the air conditioner, and configuring the pump to be on when a compressor is on during a cooling mode of the air conditioner.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 1 shows a transport structure with a roof-top air conditioner on which the present invention can be implemented.

FIG. 5 shows a table illustrating an example manner of operating the pump in conjunction with some components of the air conditioner.

DESCRIPTION OF EXAMPLE EMBODIMENTS

Figure 2:
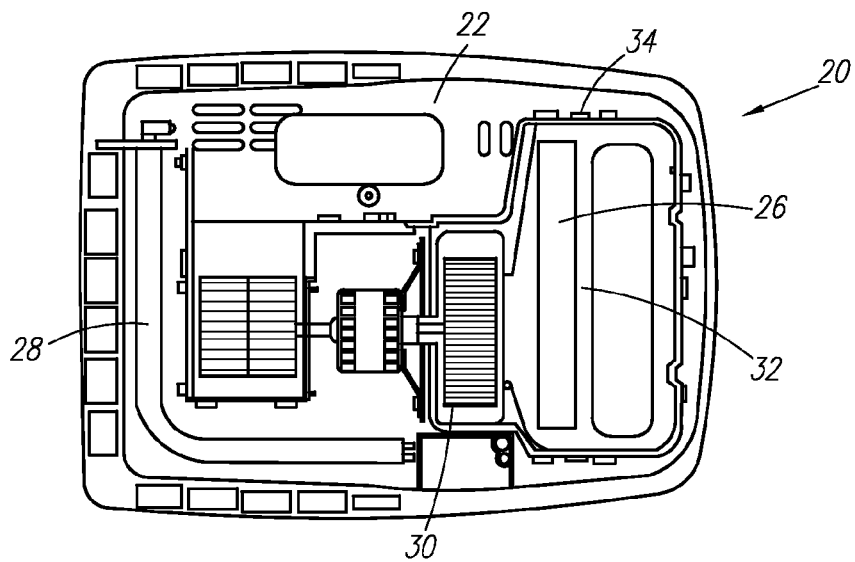
FIG. 2 shows a top view of the air conditioner in which the pump assembly may be mounted.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices.

Turning to the shown example of FIG. 1, a transport structure 10 in which the present invention can be implemented is schematically shown. The term "transport structure" should not be interpreted to be limited to this example and is meant to denote any transportation means moving about the ground, a body of water or air such as recreational vehicles, mobile homes, buses, trains, subways, boats, or the like. The transport structure 10 includes a roof 12 that provides shelter and an air conditioner 20 is mounted adjacent the roof 12. The term "air conditioner" is meant to encompass all apparatus relying on a refrigeration cycle for cooling or heating and thus include apparatus for either cooling or heating (such as heat pumps). The air conditioner 20 is elevated in that it is a roof-top type, i.e., near or on a roof, but may be configured in alternative elevated arrangements such as being mounted rearward about the transport structure 10 but still elevated about the ground. The transport structure 10 is also equipped with a schematically shown drainage means 40 having a hose 42 to discard condensate from the transport structure 10. The drainage means 40 may be gravity-driven in that condensate is discarded by gravity or may be driven by a power source such as a motor.

Figure 3:
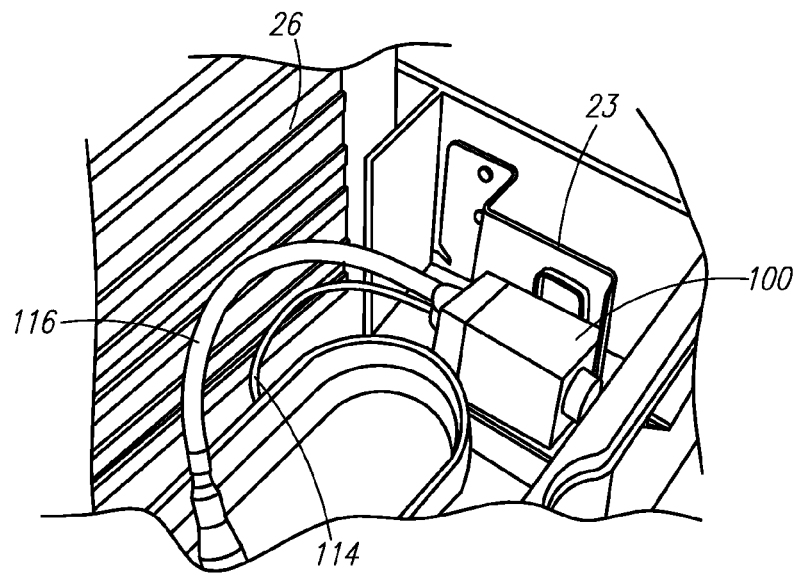
FIG. 3 shows an example embodiment of a pump and suction and discharge lines mounted inside the air conditioner.

As shown in FIGS. 2-3, the air conditioner 20 includes a base pan 22 on top of which are mounted, among other things, a compressor 24, an evaporator 26, and a condenser 28, through all of which a refrigerant fluid flows forming a refrigeration cycle. The evaporator 26 and the condenser 28 may respectively be provided with an air driving means 30 such as centrifugal or axial fans for directing conditioned air to desired interior spaces 14 of the transport structure 10. Supply and return air ports of the air conditioner 20 exchange air with the interior spaces 14 of the transport structure 10 (FIG. 1). The components of the air conditioner 20 are operatively connected with an electrical box controlling the interaction among the air conditioner components. The components may be hidden from view by a shroud placed under the base pan 22.

As shown in FIG. 3, the base pan 22 may be provided with a sump 32 under the evaporator 26 to collect falling condensate. The sump 32 may be configured with a sloping surface to direct collected condensate toward drainage holes 34 provided on the base pan 22. These drainage holes 34 may lead to hoses that direct condensate to the drainage means 40 of the transport structure 10 as discussed above.

Figure 4:
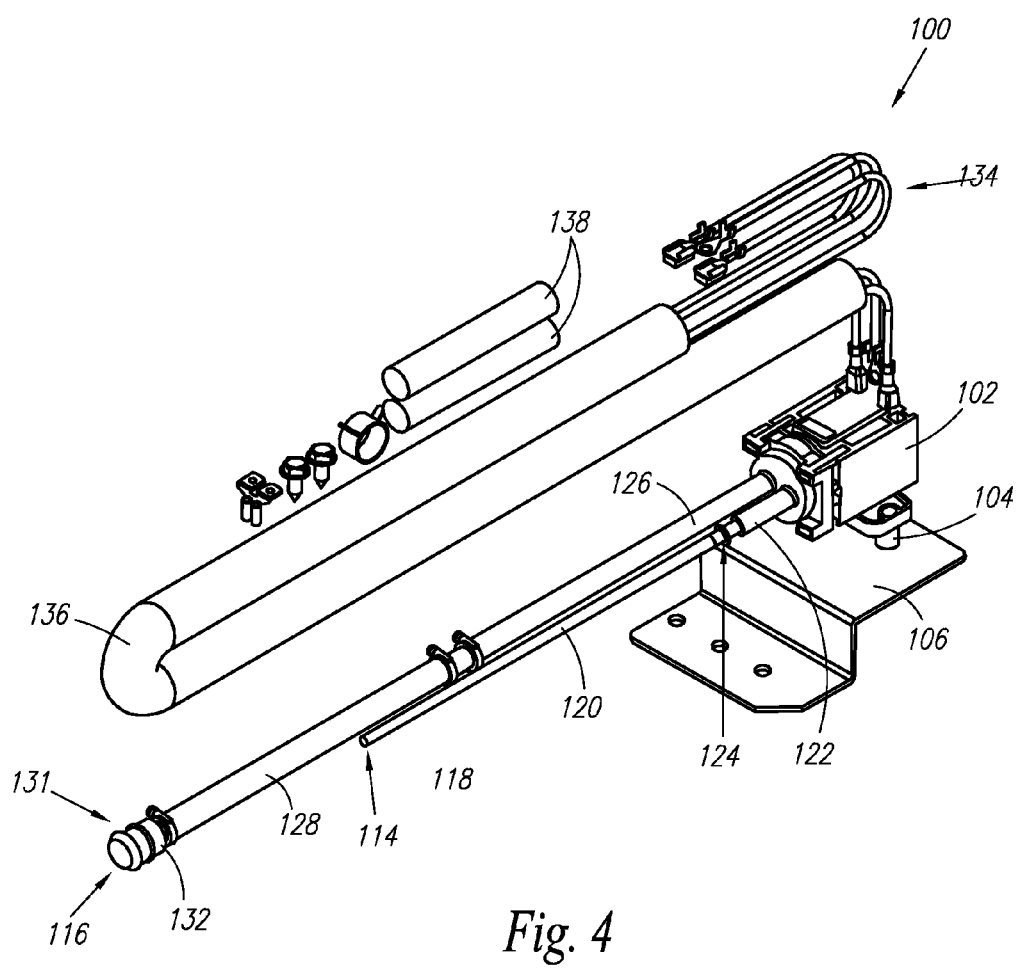
FIG. 4 shows an exploded view of components of the pump assembly.

The present invention provides a condensate removal assembly 100 which may be included as part of the air conditioner at sale or provided as an add-on kit to the air conditioner having a pre-existing condensate removal system. As shown in FIG. 4, the assembly 100 may include an off-the-shelf pump 102 mounted on a flat, vertical or horizontal surface 23 inside the air conditioner 20. For example, the pump 102 may be mounted on a vertical surface 23 near the evaporator 26. In this embodiment, the pump 102 is supported by two grommets 104 fastened to a step-shaped bracket 106 that is in turn secured to the vertical surface 23 by securing means 108 such as screws, nuts and bolts, glue or the like. The vibration of the pump 102 is thereby isolated from the air conditioner 20, and the grommets 104 and the bracket 106, being of composition such as metal, polymers or the like, may provide damping. The rubber grommets 104 may be molded as integral parts of the pump 102. The pump 102 includes a suction port 110 and a discharge port 112 as inlet and outlet respectively for condensate water. The suction port 110 accommodates a suction line 114 and the discharge port 112 accommodates a discharge line 116.

The suction line 114 and the discharge line 116 may be in a single tube or be made of a plurality of distinct tube elements connected with one another. The suction line 114 in this embodiment includes multiple tube elements at an upstream end of which is a filter 118 that is configured to be submerged in the sump 32 of the base pan 22 and to rid the incoming water of impurities that may clog or damage the pump 102. Moving further downstream from the filter 118 is a first suction tube 120 having a first diameter and a second suction tube 122 having a second diameter and connected to the suction port 110. The first diameter is smaller than the second diameter. For example, the first suction tube 120 and the second suction tube 122 may respectively have internal diameters of 1/16-3/32 in. and 1/8-5/32 in. Moreover, the first suction tube 120 and the second suction tube 122 may respectively be 9 in. and 1 in. in length. The first suction tube 120 and the second suction tube 122 may be connected together by a reduction coupler 124.

The discharge line 116 may include a first discharge tube 126 having a third diameter and connected to the discharge port 112, a second discharge tube 128 having a fourth diameter and located downstream, and a third discharge tube (not shown) having a fifth diameter and located at a downstream end 131. The discharge tubes 126, 128 may be connected with reduction couplers 132 or other tube clamping means. The third diameter is smaller than the fourth diameter which is smaller than the fifth diameter. For example, the first discharge tube 126, the second discharge tube 128 and third discharge tube may respectively have internal diameters of 3/16 in., 1/4 in., and 1/2 in. Moreover, the first discharge tube 126, the second discharge tube 128 and the third discharge tube may be 6 in., 6 in., and 4 in. in length. The changes in diameter allow the speed of condensate flow to be modified at various junctures of the discharge and suction lines 114, 116. The dimensions of the suction and discharge tubes 120, 122, 126, 128 such as length and diameter will tend to affect where in the air conditioner 20 they can be installed and the capacity of the pump 102 for transporting water. The suction tubes 120, 122 and the discharge tubes 126, 128 may be made of polymer such as silicone and may have varying degrees of transmittability of light, so as to be transparent, translucent or the like, in order to allow observation of water flow.

In its operating state, the pump 102 moves condensate water by drawing it from the sump 32 through the suction line 114 and directing it out of the discharge line 116. The pump 102 may be of a self-priming type to guard against situations where the sump 32 of the air conditioner 20 dries up and consequently the suction and discharge lines 114, 116 become filled with air.

The discharge line 116 may exit the air conditioner 20 through a return air opening. The downstream end 131 of the discharge line 116 may be routed to a drainage means 40 provided in the transport structure 10 so that, once condensate reaches the downstream end 131 of the discharge line 116, the drainage means 40, whether driven by gravity, pressure, heat or other means commonly known and used in the art, will discard the water from the transport structure 10. For example, the drainage means 40 may simply comprise a downwardly oriented hose 42 causing the condensate to flow to the ground. The drain hose 42 of the drainage means 40 may be connected to the discharge line 116 using a barbed fitting with a hose clamp.

Electrical wires 134 operatively connect the pump 102 to the electrical box of the air conditioner 20. The kit may additionally include a tube-like sleeve 136 to bundle and protect the wires 134 from contact or damage inside the air conditioner 20. As shown in the table of FIG. 5, the pump 102 may be configured to turn on and off in conjunction with the operation of some of the air conditioner components. The pump 102 may be mounted on a heating device (HP) or a cooling device (AC) and may be operated by two types of controls. In this embodiment, the pump 102 may be configured to turn off when an evaporator fan only mode is selected on a thermostat of the air conditioner, meaning that operation of only the air driving means 30 for the evaporator is desired. Moreover, the pump 102 may be configured to be on when the compressor 24 is on because a cooling mode of the thermostat is selected. The pump 102 may also be configured to be on when the compressor 24 is on because a heating mode of the thermostat is selected. The pump 102 may also be configured to be on when the compressor 24 is on because a dehumidifier mode of the thermostat is selected.

For air conditioners 20 in which condensate is drained through the drainage holes 34, the kit may include compound sealings 138 to seal the drainage holes 34 and thereby create the sump or reservoir 32 for condensate water in which the filter 118 of the suction line 114 can be submerged.

The present invention provides a kit that allows a pump 102 to be mounted inside an air conditioner 20 without significant alteration to the air conditioner 20. The pump 102 is so dimensioned that it can be housed completely inside the air conditioner 20 without hindering the other components. Moreover, the pump 102 need not be submerged under water and thus will not be located below a water level of the sump in a mounted state.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A pump assembly for removing condensate from an elevated air conditioner of a transport structure, the air conditioner including a base pan with a sump, the assembly including:
   a pump configured to be in electrical communication with the air conditioner;
   a suction line entering the pump and configured to be in fluid communication with the sump; and
   a discharge line exiting the pump and configured to be in fluid communication with a hose of a drainage means of the transport structure,
   wherein the pump operatively moves condensate in the sump to the hose of the drainage means to remove the condensate from the transport structure, and
   wherein the suction line includes an upstream portion with a first suction diameter and a downstream portion with a second suction diameter, and the first suction diameter is less than the second suction diameter.

2. The pump assembly of claim 1, wherein the drainage means is gravity-driven.

3. The pump assembly of claim 1, wherein the pump is not located below a water level of the sump.

4. The pump assembly of claim 1, wherein the pump is dimensioned to be housed completely inside the air conditioner.

5. The pump assembly of claim 1, wherein the pump is mounted in an isolated manner inside the air conditioner.

6. The pump assembly of claim 5, wherein the pump is supported by a rubber grommet mounted on a bracket element.

7. The pump assembly of claim 1, wherein the pump assembly is provided as an add-on kit to the air conditioner.

8. The pump assembly of claim 1, wherein the discharge line includes an upstream portion with a first discharge diameter and a downstream portion with a second discharge diameter, and the first discharge diameter is less than the second discharge diameter.

9. The pump assembly of claim 1, wherein the suction line includes a filter at an upstream end.

10. The pump assembly of claim 1, further including a sealant for sealing a drainage hole on the base pan of the air conditioner.

11. A pump assembly for removing condensate from an elevated air conditioner of a transport structure, the air conditioner including a base pan with a sump, the assembly including:
    a pump configured to be in electrical communication with the air conditioner;
    a suction line entering the pump and configured to be in fluid communication with the sump; and
    a discharge line exiting the pump and configured to be in fluid communication with a hose of a drainage means of the transport structure,
    wherein the pump operatively moves condensate in the sump to the hose of the drainage means to remove the condensate from the transport structure, and
    wherein the pump is configured to be off during an evaporator fan only mode of the air conditioner, and wherein the pump is configured to be on when a compressor is on during a cooling mode of the air conditioner.

12. The pump assembly of claim 11, wherein the pump is configured to be on when a compressor is on during a heating mode of the air conditioner.

13. The pump assembly of claim 11, wherein the pump is configured to be on when a compressor is on during a dehumidifier mode of the air conditioner.

14. A method of removing condensate from an elevated air conditioner of a transport structure, the air conditioner including a base pan with a sump, the method including the steps of:
    mounting a pump inside an air conditioner, the pump including a suction line entering the pump and a discharge line exiting the pump;
    connecting the discharge line to a drainage means of the transport structure;
    establishing fluid communication between the suction line and the sump;
    configuring the pump to operate through electrical communication with the air conditioner; and
    configuring the pump to be off during an evaporator fan only mode of the air conditioner, and configuring the pump to be on when a compressor is on during a cooling mode of the air conditioner,
    wherein the suction line, the pump, the discharge line and the drainage means are configured to operatively establish fluid communication.

15. The method of claim 14, the step of establishing fluid communication between suction line and the sump further including submerging an upstream end of the suction line in the sump.

16. The method of claim 14, further including the step of mounting the pump not below a water level of the sump.

17. The method of claim 14, further including the step of sealing a hole on the base pan to create the sump.

18. The method of claim 14, wherein the pump is dimensioned to be housed completely inside the air conditioner.

19. A pump assembly for removing condensate from an elevated air conditioner of a transport structure, the air conditioner including a base pan with a sump, the assembly including:

a pump configured to be in electrical communication with the air conditioner;

a suction line entering the pump and configured to be in fluid communication with the sump; and a discharge line exiting the pump and configured to be in fluid communication with a hose of a drainage means of the transport structure, wherein the pump operatively moves condensate in the sump to the hose of the drainage means to remove the condensate from the transport structure, and wherein the suction line includes a first portion and the discharge line includes a second portion, and a diameter of the first portion is less than a diameter of the second portion.

* * * * *